United States Patent Office 2,784,879
Patented Mar. 12, 1957

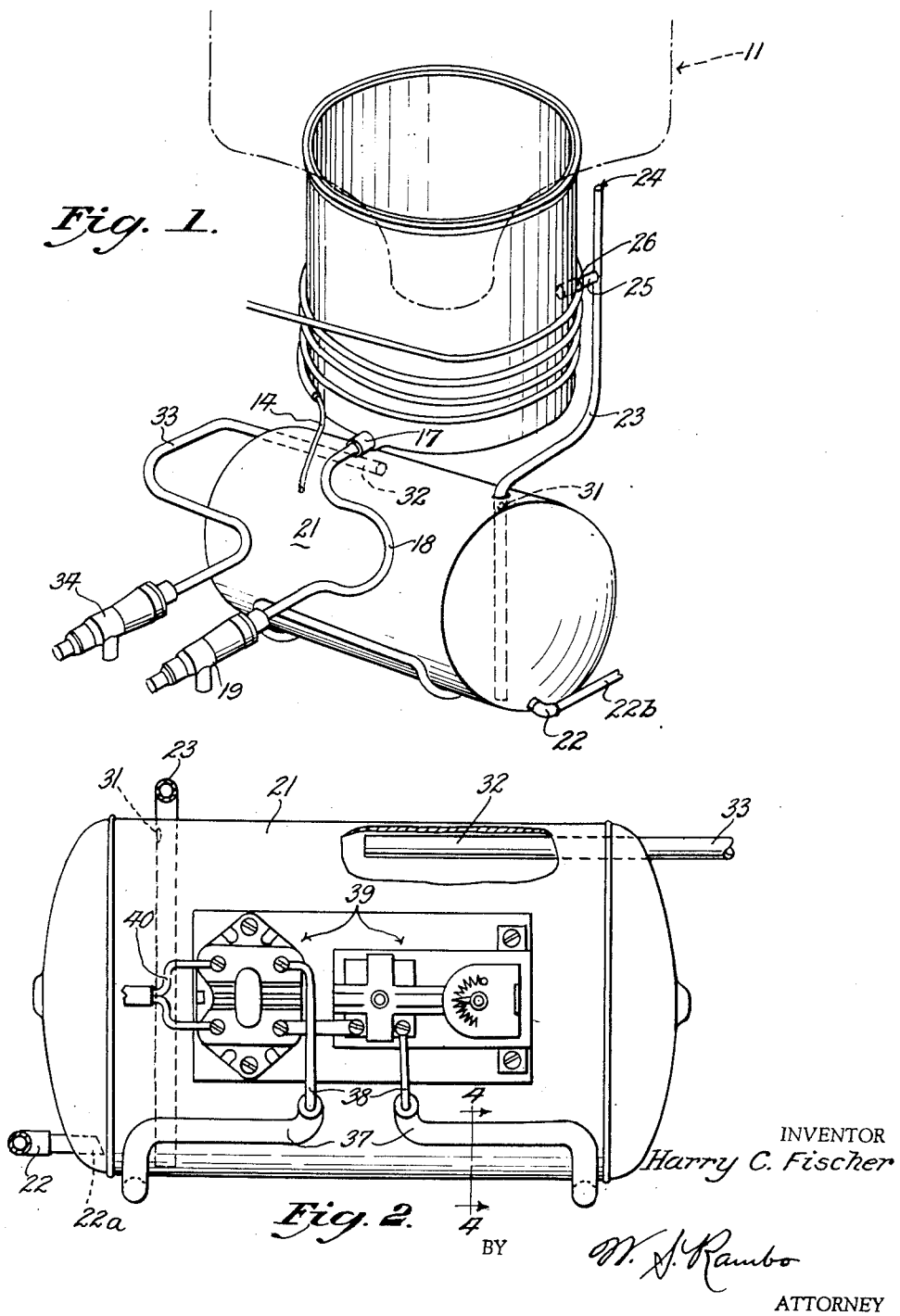

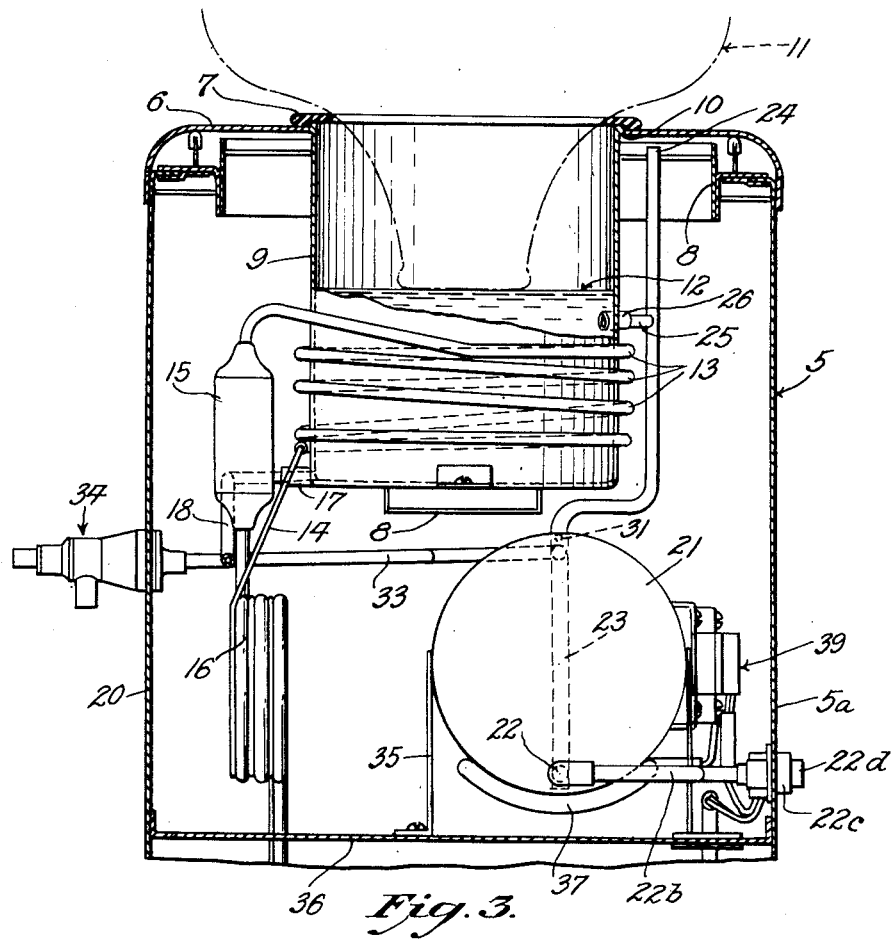
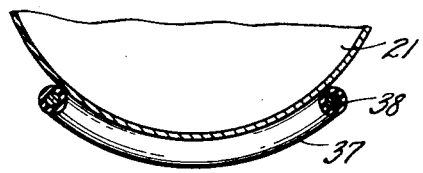

2,784,879

WATER-HANDLING AND HEAT TRANSFER APPARATUS FOR HOT AND COLD WATER DISPENSERS

Harry C. Fischer, Canal Winchester, Ohio, assignor to The Ebco Manufacturing Company, Columbus, Ohio, a corporation of Ohio Application April 29, 1955, Serial No. 504,741

3 Claims. (Cl. 222—146)

The present invention relates generally to drinking water dispensers and more particularly to an improved, combination hot and cold water dispenser of a type similar to the well known, electrically refrigerated, office-type water cooler.

In comparatively recent years there has developed an increasing practice on the part of office, factory, and plant personnel, as well as the public generally, to take a recess from routine work, particularly during morning office hours, for the purpose of obtaining and consuming a hot beverage, principally hot coffee, and this more or less accepted practice has become popularly known as a "coffee break." While this practice is largely enjoyable and refreshing to office and factory personnel, the same results in an interruption to business routine and a consequent loss in valuable labor time, due to the absence of personnel from their regularly established places or positions of business during the time required to secure and consume the desired beverage.

It is, therefore, the primary object of the present invention to provide an apparatus or machine which is similar in appearance and general size to the ordinary electrical refrigerated water cooler, which may be installed in convenient locations readily accessible to office and factory personnel, and which will provide not only a convenient source of cool drinking water, but also a source of relatively hot water for use with powdered or dry beverage-making concentrates, such as instant coffee, tea, or the like, in making hot beverages in the office or factory, thus making it possible for employees and personnel to secure their desired hot beverage without leaving the immediate premises.

It is another object of the present invention to provide a hot and cold water dispenser of this character which derives its water supply from the usual portable water supply bottle adapted to be received in the dispenser in the usual inverted position, and wherein all of the advantages of the ordinary bottle-type water cooler, such as portability and the elimination of pipe connections, drains, etc., are retained.

A further object of this invention is to provide a combination hot and cold water dispenser which comprises a novel and structurally simple water-storing and heat transfer system from which refrigerated, relatively cool drinking water and relatively hot (150–180° F.) beverage-making water may be withdrawn, respectively, through separate valve-controlled taps or outlets on the dispenser.

For a further and more complete understanding of the present invention, reference is made to the following description and the accompanying drawings, wherein:

Fig. 1 is a perspective view, in diagrammatic form, of the water-handling and heat transfer apparatus of the present invention;

Fig. 2 is an enlarged side elevational view of the water-heating tank and its associated controls;

Fig. 3 is a vertical sectional view taken through the upper portion only of the cabinet or outer casing of a combined hot and cold water dispenser showing the arrangement of the water-handling and heat transfer apparatus of the present invention; and Fig. 4 is a fragmentary transverse vertical sectional view taken along the line 4—4 of Fig. 2.

Referring now to the drawings, and more particularly to Fig. 3 thereof, the numeral 5 designates generally the outer casing or cabinet of a combined hot and cold water dispenser formed in accordance with the present invention. In Fig. 3, only the upper portion of the combined hot and cold water dispenser has been illustrated, and it will be understood that the same incorporates a lower machinery-containing section, not shown, which serves to house the usual motor driven compressor, condenser coils, fans, and other elements normally employed in electrically actuated refrigeration systems.

The upper end of the cabinet or housing 5 includes a horizontally arranged top wall 6 which is formed with a central opening bounded by a resilient sealing gasket 7. Carried in registry with the opening formed in the top wall 6 of the housing, and suitably supported upon transverse frame members 8, is a generally vertically arranged, cylindrical, open-topped, metal reservoir 9. The reservoir 9 terminates at its upper end in a rim portion 10 disposed immediately below the resilient sealing gasket 7, and the open end of the reservoir 9 is sized so as to receive and support the usual inverted water supply bottle indicated by broken lines at 11. The depth of the reservoir 9 is such that the neck portion of the water supply bottle 11 will extend downwardly into the reservoir approximately one-half its depth, in order that the normal level of water within the reservoir, assuming the water supply bottle 11 to be other than empty, will extend to about one-half the depth of the reservoir, as indicated at 12.

Wound about the outer peripheral surface of the bottom or lower end portion of the reservoir 9, and secured thereto as by soldering or welding, are the convolutions of a refrigerant evaporator coil 13 which has its lower end connected with a capillary tube 14 to receive compressed and liquefied refrigerant, and its upper end connected with an accumulator 15 carried in the return line 16 of the refrigerant compressor apparatus, not shown. It will here be understood that the evaporator coil 13, capillary tube 14, accumulator 15, and return line 16 are parts common to the ordinary type of electrically actuated mechanical refrigeration system, and, per se, form no part of the present invention aside from the combination of the evaporator coil and the function thereof in association with the present water-handling and heat transfer apparatus. The reservoir 9 is provided adjacent the bottom wall thereof with a cold water outlet connection 17 which receives one end of a conduit 18 whose opposite end extends to and is connected with the inlet of a plunger-operated shut-off valve 19 stationarily mounted on and projecting through the front wall 20 of the housing 5. Thus, water introduced within and contained in the lower portion of the reservoir 9 is chilled and refrigerated by contact with the inner wall surfaces of the reservoir 9 adjacent the refrigerant evaporator coils 13, and such chilled or refrigerated water may be discharged from the dispenser through operation of the valve or faucet 19.

Positioned below the bottom of the reservoir 9, and within the upper section of the cabinet 5, is a generally cylindrical and horizontally arranged, water-heating tank 21 which, advantageously, may be formed from copper or other relatively high heat conductivity metal. Connected at one end and at substantially the lower level of the water-heating tank 21 is an elbow-type fitting 22. One branch of the fitting 22 extends into and communicates with the interior chamber of the tank 21 at the lower level thereof, as at 22a, while the remaining branch of the fitting 22 extends exteriorly of the tank 21 and terminates in a right angle, longitudinally disposed, pipe-receiving outlet. Connected with the outlet of the fitting 22 is a drain conduit 22b which extends rearwardly through an opening formed in the back wall 5a of the cabinet and terminates in a relatively enlarged, plug-receiving fitting 22c. The fitting 22c is normally closed by a removable plug 22d which may be opened to provide for drainage of the water-heating tank 21.

Extending through the top wall of the tank 21, and welded or brazed therein, is the lower end portion of a conduit or tube 23 which extends upwardly within the upper section of the cabinet 5 and terminates at its extreme upper end in an air vent opening 24 disposed well above the normal level of liquid 12 within the reservoir 9. Intermediate its ends, the conduit 23 is provided with a relatively short branch pipe 25 which is connected with an outlet fitting 26 extending through the wall of the reservoir 9 a distance slightly below the normal level of water 12 within the reservoir 9, and substantially above the upper convolution of the evaporator coil 13. The lower end of the conduit 23 extends downwardly within the water-heating tank 21 and terminates in an outlet disposed adjacent the bottom of the tank. The conduit 23 is formed with a relatively small vent opening 31 disposed immediately below the upper wall of the tank on a level corresponding substantially to the uppermost level of the tank 21. The vent opening 31 provides for the counterflow of air upwardly through the conduit 23 as water passes or flows downwardly through the conduit 23, and such air is exhausted through the opening 24 whereby the tank 21 may be completely filled by the gravitational flow of water from the reservoir without first opening the upper end of the tank to the atmosphere.

Extending through an end wall of the tank, substantially at the uppermost level thereof but slightly below the level of the vent opening 31, is one end 32 of a hot water-discharging conduit 33. As shown particularly in Figs. 1 and 3, the conduit 33 extends outwardly from the tank 21 and forwardly of the cabinet 5 and is connected at its opposite end with the inlet of a plunger-operated hot water-discharging valve or faucet 34, the latter being stationarily supported in a suitable opening formed in the front wall 20 of the cabinet 5 in transversely spaced relation to the cold water valve or faucet 19.

As shown in Fig. 3, the tank 21 is supported within the upper section of the cabinet 5 by means of suitable brackets 35 arising from a transverse, horizontally disposed, supporting wall 36. Connected with the bottom wall of the water-heating tank 21, as by brazing, is the outer metallic jacket or sheath 37 of an electrical resistance-type heating element 38. The heating element 38 and its outer jacket are of general saddle shape and conform to the curvature of the lower or bottom wall of the tank 21, in order to direct heat by conduction through the walls of the tank 21 to the water contained therein. As shown in Fig. 2, the ends of the electrical resistance element 38 are suitably electrically connected with terminal posts carried upon thermostat control elements 39, as fully set out in my copending U. S. application for Letters Patent Serial No. 495,455, filed March 21, 1955, entitled Electrically Actuated Water Heating Apparatus for Hot and Cold Water Dispensers. The heating element 38 and thermostat controls 39 are supplied operating current through electrical lead wires 40 arranged to be connected with any suitable source of electrical power, not shown. Generally speaking, the thermostatic controls 39 function to maintain the temperature of water within the water-heating tank 21 at a predetermined and adjustable high level, say, for example, between 150 and 180° F., and further provide a safety overload device to prevent overheating of the tank 21 in the event of short circuiting in the operating circuit for the resistance element 38.

In operation, the present hot and cold water dispenser is conditioned for use first by placing the water supply bottle 11 in an inverted position within the open upper end of the reservoir 9. Such arrangement provides a normal level of liquid 12 within the reservoir, which level is maintained until the bottle 11 is emptied through discharge of water by way of either of the valves 19 and 34. The refrigeration system of the dispenser is then placed in operation by connection with any suitable electrical power source, and water within the reservoir 9 is chilled by operation of the evaporator coils 13 to provide a ready source of cold or refrigerated water which may be discharged by opening of the valve or faucet 19. Water is supplied to the tank 21 by way of the conduit 23, and the tank 21 may be completely filled without opening the associated hot water discharge valve 34 by reason of the vent openings 31 and 24. As the resistance heating element 38 becomes alternately energized, the water is heated within the tank 21 in the lower or bottom level thereof, and the hotter water travels by convection flow to the uppermost region of the tank 21 where the same is readily available for discharge through the valve or faucet 34. As a given high temperature is attained within the tank 21, the controls 39 function to deenergize the heating element 38 whereby to maintain the water at a substantially constant temperature. In this connection, it is important to note that due to the arrangement of the hot water outlet conduit 33 substantially at the upper level of the tank 21, the same may not be completely drained through opening of the discharge valve 34, even after exhaustion of the water supply upon emptying of the bottle 11. In this manner, inadvertent emptying of the tank 21 is prevented, and a level of water within the tank 21 is at all times assured in order to absorb heat through operation of the resistance element 38. In the event it is desired to drain the tank 21 for disassembly or cleaning purposes, the plug 22d disposed on the rear side of the cabinet 5 may be removed to completely drain the hot water system.

In view of the foregoing, it will be seen that the present invention provides an improved, efficient, yet structurally simple, water-handling and heat transfer apparatus for combination hot and cold water dispensers. Hot and cold water dispensers formed in accordance with the present invention provide a readily available source of both refrigerated or chilled drinking water and relatively hot beverage-making water for the use of office or factory personnel, and are further characterized by their time-saving ability in providing a means for eliminating the so-called "coffee break" and the working time lost through such practice.

While I have disclosed in some detail a present preferred embodiment of the invention, it will be understood that the same is susceptible to various modifications as to details of construction and design without departing from the spirit of the invention or the scope of the following claims.

I claim:

1. In an apparatus for dispensing both hot and cold drinking water; a substantially vertically arranged, open top reservoir for the supporting reception of an inverted water supply bottle; refrigerating means carried in heat-transfer relation to the lower portion of said reservoir for cooling water contained in said reservoir; cold water outlet means communicating with the lower end of said reservoir; a substantially closed water-heating tank positioned below said reservoir; electrically energized heating means disposed in heat-transfer relation to said tank for heating water introduced therein; hot water outlet means communicating with said tank substantially at the upper level thereof; conduit means communicating at one end with said reservoir above said refrigerating means and below the normal level of water received therein from an inverted bottle supported by said reservoir, said conduit means having an opposite end communicating with the interior of said tank substantially at the lower level thereof and serving to conduct water from said reservoir to said tank; and vent means formed in said conduit means in the portion thereof which extends into the interior of said tank, said vent means being arranged in said conduit means only slightly below the upper wall of said tank and serving to exhaust trapped air from said conduit means and said water-heating tank independently of said hot water outlet means, whereby to provide for the free flow of water from said reservoir to said tank.

2. In a hot and cold water dispenser; a substantially vertically arranged, open top reservoir adapted to receive therein and support the neck portion of an inverted water supply bottle; a refrigerant evaporator coil carried about the lower end portion of said reservoir for chilling water contained in said lower end portion; cold water outlet means communicating with the lower end of said reservoir; a substantially closed water-heating tank arranged below the bottom level of said reservoir; means to heat said tank and its contents; hot water outlet means communicating with said tank substantially at the upper level thereof; a conduit having an upper end connected with said reservoir to receive water from a level within said reservoir above said evaporator coil and a lower end communicating with said tank substantially at the lower level thereof; and vent means formed in said conduit above the lower end thereof in communication with the upper interior portion of said tank for exhausting air from said conduit and said tank upon the passage of water from said reservoir to said tank independent of the opening of said hot water outlet means.

3. In a hot and cold water dispenser; an open top reservoir for the reception of an inverted water supply bottle, said reservoir having a bottom and a cold water outlet disposed adjacent its bottom; a refrigerating coil disposed around the bottom portion of said reservoir for chilling water introduced therein; a substantially closed water-heating tank arranged below said reservoir; electrically energized means to heat said tank and its contents; hot water outlet means communicating with said tank substantially at the upper level thereof; conduit means having an inlet portion connected with said reservoir to receive water from a level within said reservoir substantially above said refrigerating coil and an outlet portion communicating with said tank substantially at the lower level thereof; and vent means formed in said conduit means and disposed at substantially the uppermost interior level of said tank for exhausting air from said tank by way of said conduit means, whereby to permit the free gravitational flow of water from said reservoir to said tank and the filling of said tank without opening said hot water outlet means.

References Cited in the file of this patent
UNITED STATES PATENTS

| | | |
|---|---|---|
| 441,628 | Coon et al. | Nov. 25, 1890 |
| 1,009,437 | Patnaude | Nov. 21, 1911 |